United States Patent
Du et al.

(10) Patent No.: US 11,884,103 B2
(45) Date of Patent: Jan. 30, 2024

(54) SPRING SUPPORT DEVICE AND VEHICLE HAVING THE SAME

(71) Applicant: SHANGHAI LINGHUO TRADING CO., LTD., Shanghai (CN)

(72) Inventors: Dehui Du, Shanghai (CN); Jia Fu, Shanghai (CN)

(73) Assignee: SHANGHAI LINGHUO TRADING CO., LTD., Shanghai (CN)

( * ) Notice: Subject to any disclaimer, the term of this patent is extended or adjusted under 35 U.S.C. 154(b) by 0 days.

(21) Appl. No.: 18/114,253

(22) Filed: Feb. 25, 2023

(65) Prior Publication Data

US 2023/0382161 A1     Nov. 30, 2023

(30) Foreign Application Priority Data

May 24, 2022    (CN) .......................... 202221363031.X

(51) Int. Cl.
    *B60B 35/00*      (2006.01)
    *B60G 11/00*     (2006.01)

(52) U.S. Cl.
    CPC ............ *B60B 35/007* (2013.01); *B60G 11/00* (2013.01); *B60G 2204/124* (2013.01)

(58) Field of Classification Search
    CPC .. B60B 35/007; B60G 11/00; B60G 2204/124
    See application file for complete search history.

(56) References Cited

U.S. PATENT DOCUMENTS

| | | | |
|---|---|---|---|
| 3,901,494 A | 8/1975 | Sena | |
| 6,945,548 B2 * | 9/2005 | Dudding | B60G 7/04 267/66 |
| 2006/0103102 A1 | 5/2006 | Mullican | |

FOREIGN PATENT DOCUMENTS

| | | | |
|---|---|---|---|
| CN | 2579692 Y | * | 10/2003 |
| CN | 1990275 A | * | 7/2007 |
| CN | 216467237 U | * | 5/2022 |
| CN | 218536217 U | * | 2/2023 |
| JP | 2020-128175 A | | 8/2020 |
| KR | 10-2006-0002423 A | | 1/2006 |
| KR | 10-2022-0005109 A | | 1/2022 |

* cited by examiner

*Primary Examiner* — Faye M Fleming
(74) *Attorney, Agent, or Firm* — Cheng-Ju Chiang

(57) ABSTRACT

The present document provides a spring support device and a vehicle having the same. The spring support device includes a first support unit for supporting a damper spring. The first support unit includes a first support body configured for being connected to a vehicle body, and a spring support which is detachably fixed to the first support body. Due to the separation arrangement between the spring support and the first support body, suitable first support body and spring support can be selected as required, which can satisfy requirements of different vehicles in the vehicle modification process. Since the spring support is separated from the first support body, an area between the spring support and the first support body can be sprayed before assembly when spraying protective paint. Therefore, it is convenient to spray protective paint efficiently.

27 Claims, 11 Drawing Sheets

SPRING SUPPORT DEVICE AND VEHICLE HAVING THE SAME

CROSS REFERENCE TO RELATED APPLICATION

The present document claims the benefit of priority of Chinese patent application number 202221363031.X, filed on May 24, 2022, and entitled "A SPLIT-TYPE SPRING SUPPORT DEVICE AND VEHICLE AXLE HAVING THE SAME". The entire disclosure of the above-identified application is incorporated herein by reference.

TECHNICAL FIELD

The present document relates to automobile structures, in particular to a spring support device and a vehicle having the same.

BACKGROUND

Since the launch of the first off-road vehicle model, the appearance, interior trim, four-wheel drive technology, and power system of the off-road vehicle have made great progress, however, as the core of the chassis, the integral front axle assembly has not been substantially improved.

SUMMARY

The present document discloses, among other things, a spring support device and a vehicle having the same. It is more convenient for the spring support device to adapt different types of vehicles during vehicle modification, and it is more convenient for the spring support device to spray protective paint efficiently.

The spring support device includes a first support unit for supporting a damper spring. The first support unit includes a first support body configured for being connected to a vehicle body, and a spring support which is detachably fixed to the first support body.

In some embodiments, the spring support is provided with a first indentation, the first support body is provided with a second indentation, an insert block is disposed in the first indentation and the second indentation, preventing the spring support from rotating relative to the first support body.

In some embodiments, the spring support device further includes a first connection unit configured for detachably fixing the spring support to the first support body.

In some embodiments, the spring support is provided with a first connection hole, the first support body is provided with a second connection hole, the first connection unit passes through the first connection hole and the second connection hole, to fix the spring support to the first support body.

In some embodiments, the first connection unit includes a first connection member and a fixation member, the first connection member passes through the first connection hole and the second connection hole, the fixation member cooperates with the first connection member, preventing the first connection member from coming out of the first support unit.

In some embodiments, the spring support device further includes a second support unit which is fixed to the vehicle body, the first support unit is detachably fixed to the second support unit by the first connection unit.

In some embodiments, the second support unit is provided with an elongate hole, the first connection unit passes through the first connection hole, the second connection hole and the elongate hole, for fixing the first support unit to the second support unit.

In some embodiments, the first support body includes a first support substrate and two first sidewalls disposed at opposite sides of the first support substrate, the second support unit includes a second support substrate and two second sidewalls disposed at opposite sides of the second support substrate, the elongate hole is defined in the second support substrate, the spring support is detachably fixed to the first support substrate, the first sidewall has a first arc surface which is capable of sliding around an axle tube of the vehicle body.

In some embodiments, the first support unit has a first contact surface, the second support unit has a second contact surface capable of having different angles relative to the first contact surface.

In some embodiments, one of the first contact surface and the second contact surface is provided with a plurality of protrusions, the other one of the first contact surface and the second contact surface is provided with a plurality of depressions, the protrusions each is capable of engaging with different depressions.

In some embodiments, the spring support device includes a second connection unit disposed at one side of the first support unit and the second support unit, for fixing the first support unit to the second support unit.

In some embodiments, the second connection unit includes a cover plate, a first connection base, and a second connection member, the first connection base is connected with the first support unit, the cover plate is capable of covering the first connection base, the second connection member is capable of going through the cover plate and connecting with the vehicle body, for fixing the first support unit to the second support unit.

In some embodiments, the second connection unit further includes a second connection base being connected to the vehicle body, the second connection base is disposed between the first connection base and the vehicle body, the second connection member is capable of going through the cover plate and connecting with the second connection base, for fixing the first support unit to the second support unit.

In some embodiments, the first connection base includes a third contact surface, the cover plate includes a fourth contact surface, one of the third contact surface and the fourth contact surface is provided with a plurality of protrusions, the other one of the third contact surface and the fourth contact surface is provided with a plurality of depressions, the protrusions each is capable of engaging with different depressions.

The present document also discloses a spring support device, which includes a first support unit configured for supporting a damper spring, a second support unit configured for being fixed to a vehicle body, a first connection unit capable of providing a first fixation point for the first support unit to the second support unit, and a second connection unit capable of providing a second fixation point for the first support unit to the second support unit.

In some embodiments, the second connection unit includes a first connection base capable of moving together with the first support unit, and a cover plate capable of covering the first connection base, the first support unit includes a first contact surface, the second support unit includes a second contact surface capable of having different angles relative to the first contact surface, the first connection base includes a third contact surface, the cover plate includes a fourth contact surface capable of having different angles relative to the third contact surface, a plurality of protrusions and a plurality of depressions are formed between the first contact surface and the second contact surface, or between the third contact surface and the fourth contact surface, and the protrusions each is capable of engaging with different depressions.

In some embodiments, the first support unit includes a first support substrate, two first sidewalls disposed at opposite sides of the first support substrate, and a spring support detachably connected with the first support substrate, the second support unit includes a second support substrate and two second sidewalls being fixed to an axle tube of the vehicle body, the second support substrate is provided with an elongate hole for allowing the first connection unit passing through, if the second contact surface is disposed at different angles relative to the first contact surface, the first connection unit locates at different longitudinal positions of the elongate hole.

The present document further discloses a vehicle, which includes a damper spring and a spring support device for supporting the damper spring. The spring support device includes a first support unit and a first connection unit configured for detachably connecting the first support unit to a vehicle body. The first support unit includes a first support body configured for being connected to the vehicle body, and a spring support which is detachably fixed to the first support body.

In some embodiments, the spring support is provided with a first indentation and a first connection hole, the first support body is provided with a second indentation and a second connection hole, an insert block is disposed in the first indentation and the second indentation, preventing the spring support from rotating relative to the first support body, the first connection unit passes through the first connection hole and the second connection hole, fixing the spring support to the first support body.

In some embodiments, the spring support device further includes a second support unit being fixed to the vehicle body, the first connection unit provides a first fixation point for the first support unit to the second support unit.

In some embodiments, the spring support device further includes a second connection unit disposed at one side of the first support unit and the second support unit, for providing a second fixation point for the first support unit to the second support unit.

In some embodiments, the first support body includes a first support substrate and two first sidewalls disposed at opposite sides of the first support substrate, the second support unit includes a second support substrate and two second sidewalls disposed at opposite sides of the second support substrate, the second support substrate is provided with an elongate hole, the first connection unit passes through the first support substrate and the elongate hole, to fix the first support body to the second support body at the first fixation unit.

In some embodiments, the second connection unit includes a first connection base capable of moving together with the first support unit, and a cover plate capable of covering the first connection base, the first support unit includes a first contact surface, the second support unit includes a second contact surface, the first connection base includes a third contact surface, the cover plate includes a fourth contact surface, a plurality of protrusions and a plurality of depressions are formed between the first contact surface and the second contact surface, or between the third contact surface and the fourth contact surface, and the protrusions each is capable of engaging with different depressions.

In some embodiments, due to the separation arrangement between the spring support and the first support body, suitable first support body and spring support can be selected as required, which can satisfy requirements of different vehicles in the vehicle modification process. Furthermore, since the spring support is separated from the first support body, an area between the spring support and the first support body can be sprayed before assembly when spraying protective paint. Therefore, it is convenient to spray protective paint efficiently. In some embodiments, the elongate hole and the arrangement of the protrusions and depressions make the spring support may face different directions to adapt different vehicles. Furthermore, the arrangement of the protrusions and depressions can prevent the first support unit from rotating relative to the second support unit and the vehicle body.

DETAILED DESCRIPTION OF PREFERRED EMBODIMENTS

Figure 1:
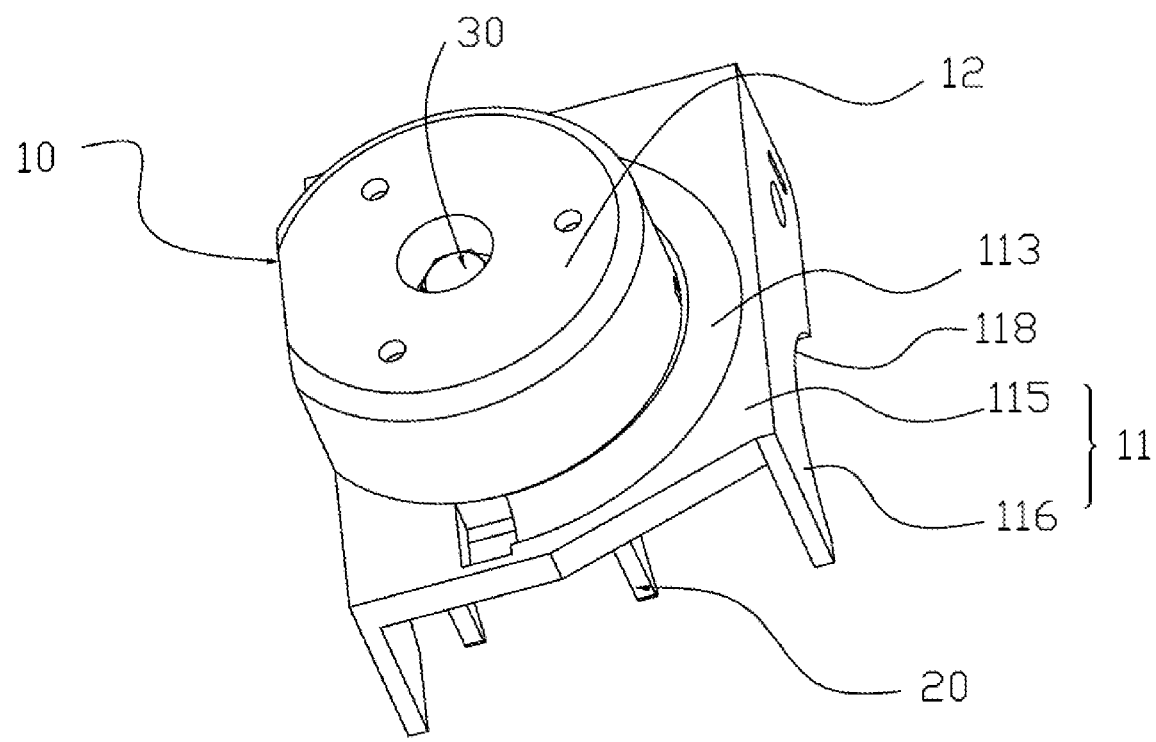
FIG. 1 is a schematic, isometric view of a first example of a spring support device.

In order to make the purpose, the technical solutions and the advantages of the present document, various embodiments will be further described in detail.

It should be noted that in the description, terms such as "first" and "second" are used to distinguish similar objects, and are not necessarily used to describe a specific order or sequence. It is to be understood that the data so used are interchangeable under appropriate circumstances such that the embodiments described herein can be practiced in sequences other than those illustrated or described herein.

In the present document, the orientation or positional relationship indicated by the terms "upper", "lower", "top", "bottom", etc. are based on the orientation or positional relationship shown in the drawings, and are only for the convenience of describing and for simplifying the description, rather than indicating or implying that the device or element must have a specific orientation, be constructed and operate in a specific orientation, and thus should not be construed as limitation of the disclosure. The X direction refers to the length direction of a vehicle, the Y direction refers to the width direction of the vehicle, and the Z direction refers to the height direction of the vehicle.

In addition, unless be clearly specified and limited, terms such as "install", "connect", "link" and "fix" in the present document should be interpreted in a broad sense. For example, the term may be used to describe a fixed connection or a detachable connection, or an integration into a single piece; directly connected, or indirectly connected through an intermediary, and may be an internal communication between two elements or an interaction relationship between two elements, unless otherwise clearly defined. For those of ordinary skill in the art the specific meanings of the above terms in the present document can be understood according to specific situations.

BRIEF INTRODUCTION

In the past 25 years, the global sales of off-road vehicles have exceeded 30 million, and consumers' demand for customization and modification of such models is also increasing day by day. For global automakers and modification shops, changing to bigger tires, replacing or enhancing the suspension system to lift the vehicle chassis for more ground clearance, and making the overall appearance of the vehicle more attractive have become the most common ways of customization in the industry. The damper spring is one of the important components of the vehicle. When the vehicle chassis is lifted, an installation angle of the damper spring will be changed as well, in order to adapt to the vehicle chassis of different heights.

The spring support device includes a support body and a spring support disposed on the support body. The spring support device is fixed to the vehicle (for example, a vehicle) through the support body, and an end of the damper spring is disposed around the spring support. The spring support device is required to be specially made for the modified vehicle. Therefore, during fine-tune, it is necessary to replace different spring support device to test whether it is compatible with the vehicle. Meanwhile, after the overall vehicle is fine-tuned, it is also necessary to carry out anti-rust treatment (for example, spraying protective paint) for the entire suspension system. However, since the spring support has been integrally fixed to the support body, an area between the spring support and the support body cannot be sprayed with the protective paint, which will lead to the corrosion of the spring support device at the area between the spring support and the support body, and accordingly causing potential safety hazards.

EMBODIMENTS

In one example aspect, the present document provides a spring support device and a vehicle having the same. It is more convenient for the spring support device to adapt different types of vehicles during vehicle modification, and it is more convenient for the spring support device to spray protective paint efficiently.

First Embodiment

Referring to FIG. 1, a first example of the spring support device includes a first support unit 10, a second support unit 20 and a first connection unit 30. The first support unit 10 is configured for supporting a damper spring. The second support unit 20 is capable of being fixed to a vehicle body, such as an axle tube of a vehicle. The first connection unit 30 is capable of detachably fixing the first support unit 10 to the second support unit 20.

Figure 2:
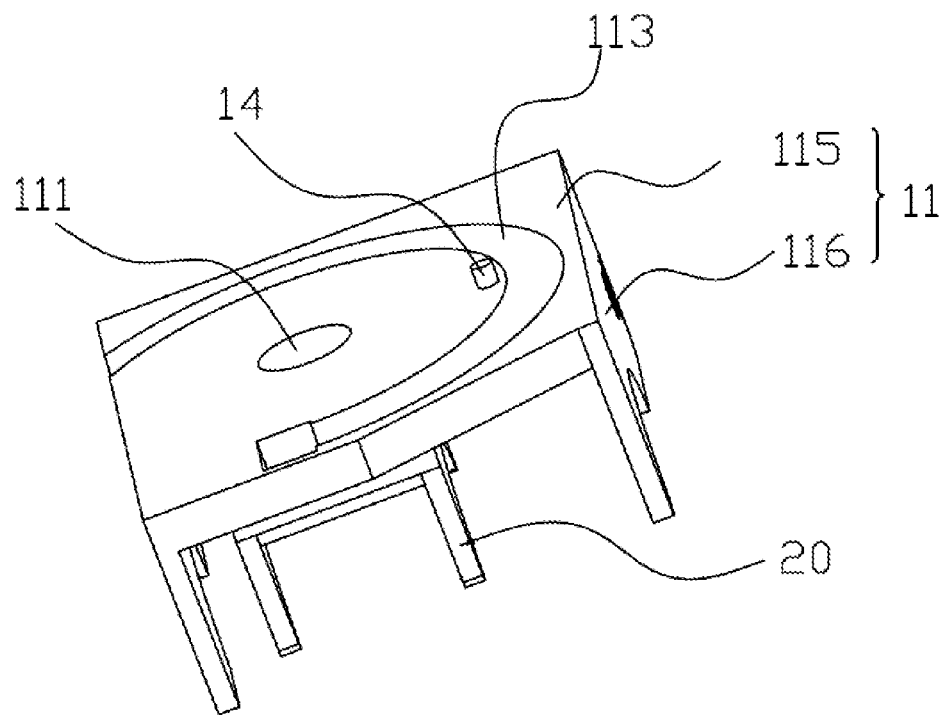
FIG. 2 is a schematic, isometric view of the spring support device in FIG. 1 after removing a spring support.
Figure 3:
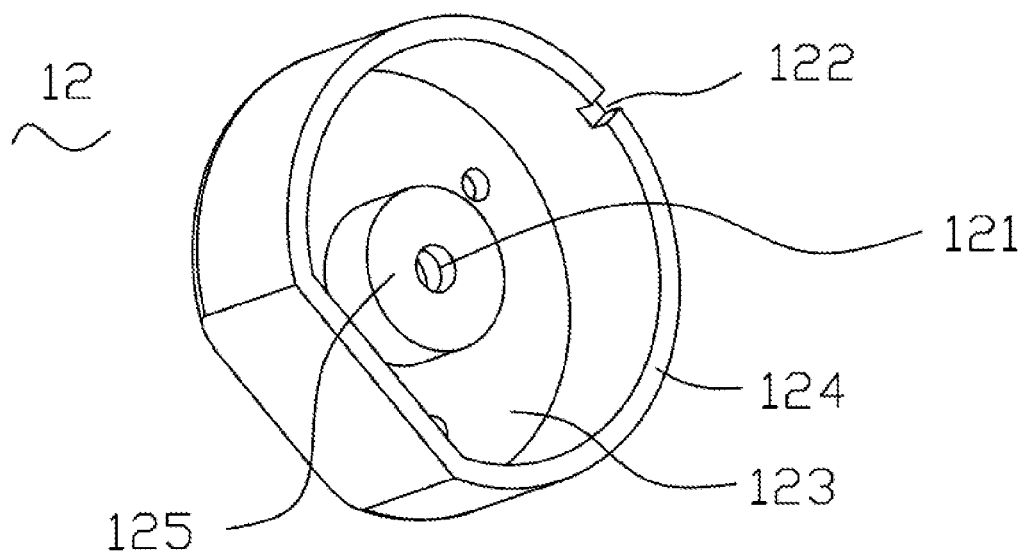
FIG. 3 is a schematic, isometric view of a spring support in FIG. 1.
Figure 4:
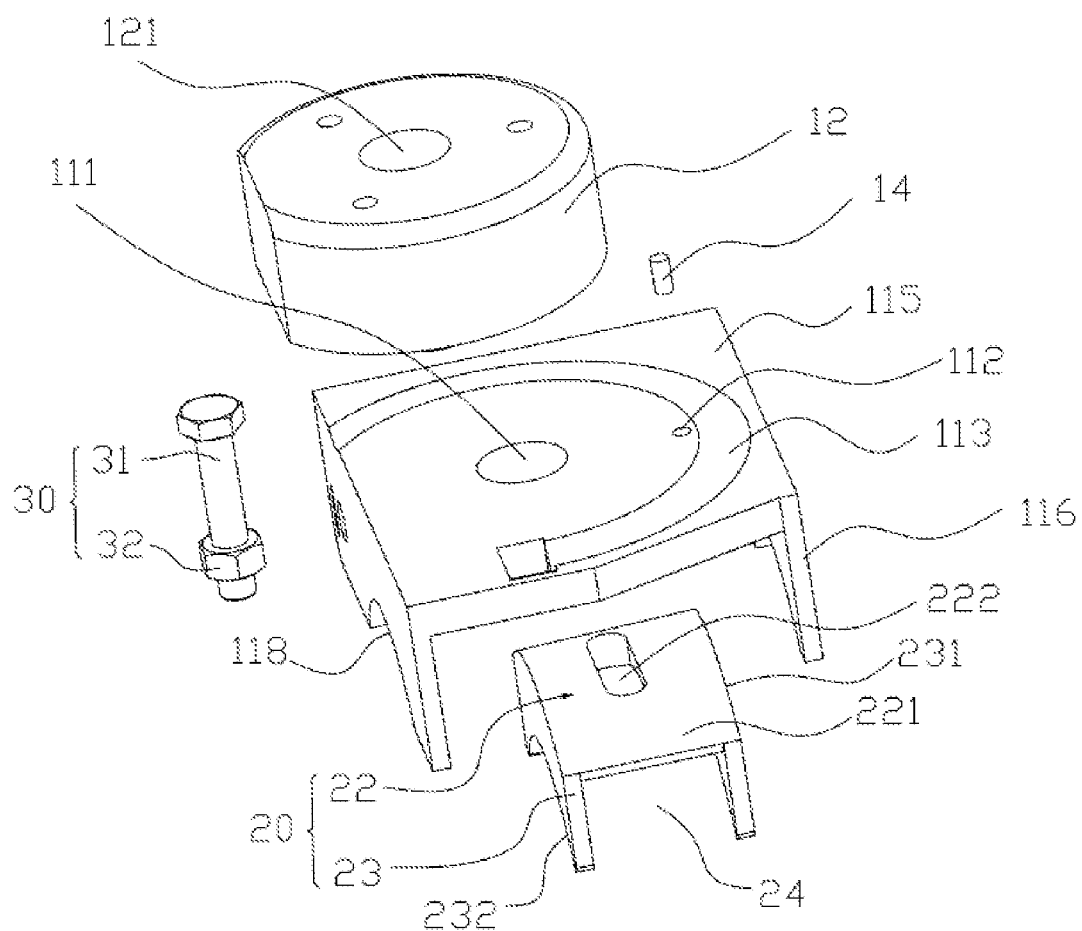
FIG. 4 is a schematic, exploded view of the spring support device in FIG. 1.

Referring to FIG. 2 to FIG. 4, the first support unit 10 includes a first support body 11 and a spring support 12 which is separated from the first support body 11. The spring support 12 is provided with a first connection hole 121, the first support body 11 is provided with a second connection hole 111, a portion of the first connection unit 30 is inserted through the first connection hole 121 and the second connection hole 111, for fixing the spring support 12 to the first support body 11. The spring support 12 is provided with a first indentation 122 on a side facing the first support body 11, the first support body 11 is provided with a second indentation 112 on a side facing the spring support 12. An insert block 14 is disposed in the first indentation 122 and the second indentation 112, preventing the spring support 12 from rotating relative to the first support body 11.

The first support body 11 includes a first support substrate 115 and two first sidewalls 116. The first support substrate 115 is substantially rectangular shaped, and has an arc-shaped first contact surface 117 (shown in FIG. 6) depressed in a lower surface. The first contact surface 117 is a convex surface with a central portion thereof protruding toward the spring support 12. The second connection hole 111 and the second indentation 112 are formed on the first support substrate 115, and the spring support 12 is arranged on an upper side of the first support substrate 115. The first support substrate 115 is provided a C-shaped recess 113 at a portion surrounding the spring support 12, for enclosing an end of the damper spring.

The first sidewalls 116 extend downwardly from opposite left and right sides of the first support substrate 115. The first sidewall 116 is substantially rectangular shaped, and has a first arc surface 118 on a lower portion thereof. The first arc surface 118 is coplanar with an outer circumferential surface of the axle tube, which makes the first sidewall 116 of the first support unit 10 can perfectly match the outer circumferential surface of the axle tube. Therefore, the first support unit 10 can slide around the axle tube during assembly, and the first support unit 10 may have different installation angles on the axle tube. When the first support unit 10 is placed on the second support unit 20, the second support unit 20 is located between the two first sidewalls 116, with the first arc surface 118 of the first sidewall 116 abutting against the axle tube, in order to optimize a force exerted on the first support unit 10.

The spring support 12 is fixed to the first support substrate 115 at a side away from the vehicle body. The spring support 12 has an end plate 123 and an annular wall 124 extending downwardly from an outer edge of the end plate 123. The end plate 123 is substantially round shape and has a depressed platform 125 at a middle portion thereof. The first connection hole 121 is defined in the depressed platform 125. The first indentation 122 is defined in the annular wall 124 at an end adjacent to the first support substrate 115. The first connection hole 121 aligns with the second connection hole 111, allowing the first connection unit 30 passing through. In this embodiment, the first connection hole 121 and the second connection hole 111 are round holes.

The second support unit 20 includes a second support body which includes a second support substrate 22 and two second sidewalls 23. The second sidewalls 23 are arranged at opposite left and right sides of the second support substrate 22.

Viewed from the left or the right side of the second support unit 20 (i.e., viewed from Y direction of the vehicle), the second support substrate 22 is arc-shaped and the second sidewalls 23 are substantially sector-shaped. The second support substrate 22 has an arc-shaped second contact surface 221 on an upper side for contacting with the first contact surface 117. The second contact surface 221 is a convex surface with a central portion thereof protruding toward the first support unit 10. In some embodiments, when viewed from the left or the right side of the second support unit 20, the first contact surface 117 and the second contact surface 221 may be a portion of a polygon, and the number of sides of the polygon may be 8, 12, 16, 24, 32, 36, 72, or etc. In such embodiments, the first support unit 10 may be well attached to the second support unit 20 with installation angles therebetween can be regulated as required. In some embodiments, the first contact surface 117 and the second contact surface 221 may be planar surfaces, and in such embodiments, the installation angles between the first support unit 10 and the second support unit 20 can not be regulated. The second support substrate 22 includes an elongate hole 222 which extends along a longitudinal direction of the second contact surface 221, allowing the first connection unit 30 can be located at different longitudinal positions thereof.

The second sidewall 23 has a second arc surface 231 and a third arc surface 232. The second arc surface 231 is disposed at an outer portion of the second sidewall 23 and coplanar with the second contact surface 221. The third arc surface 232 is disposed at an inner portion of the second sidewall 23 and parallel to the second arc surface 231. In some embodiments, the third arc surface 232 is coplanar with the outer circumferential surface of the axle tube, resulting the second support unit 20 can be firmly bonded or welded to the axle tube into a single piece.

Figure 5:
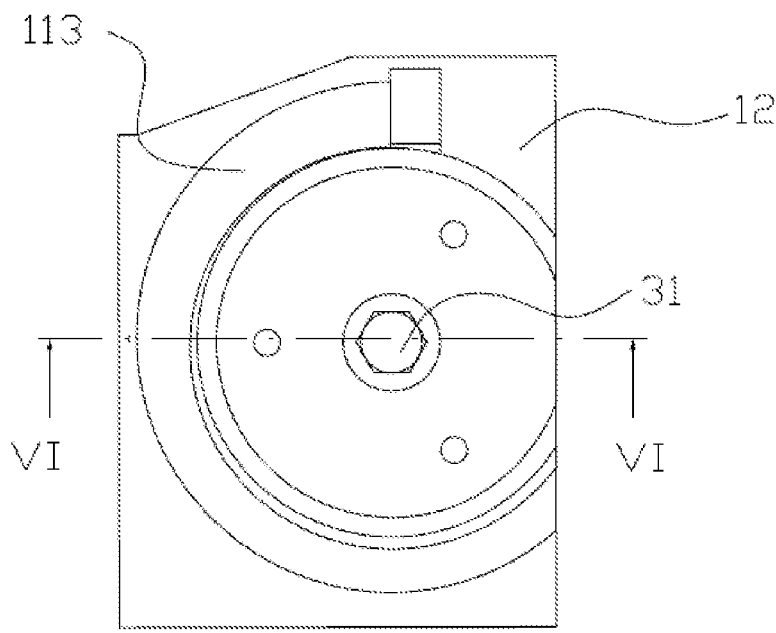
FIG. 5 is a schematic, top view of the spring support device in FIG. 1.
Figure 6:
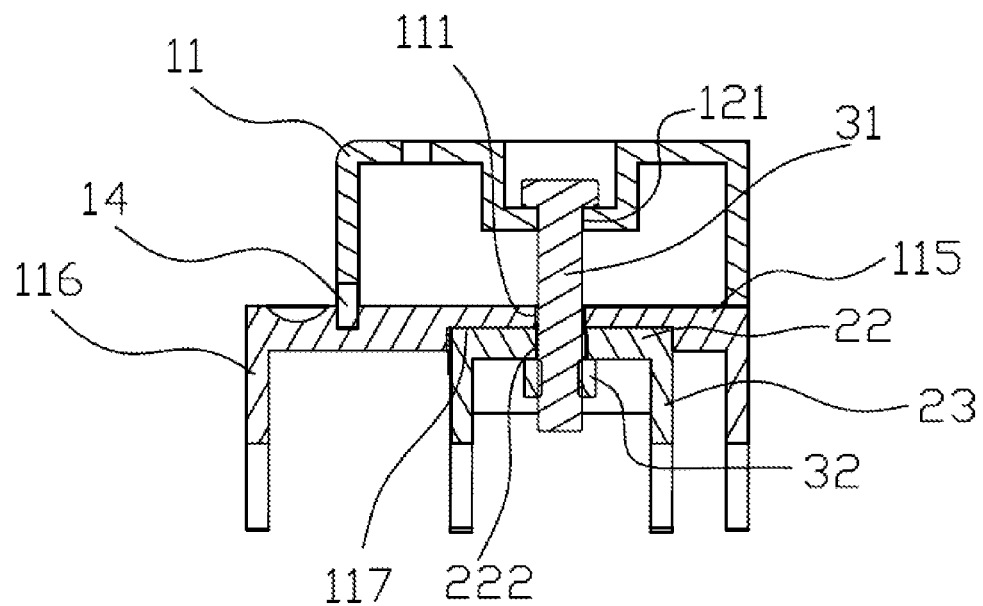
FIG. 6 is a schematic, cross-sectional view taken along line VI-VI of FIG. 5.
Figure 7:
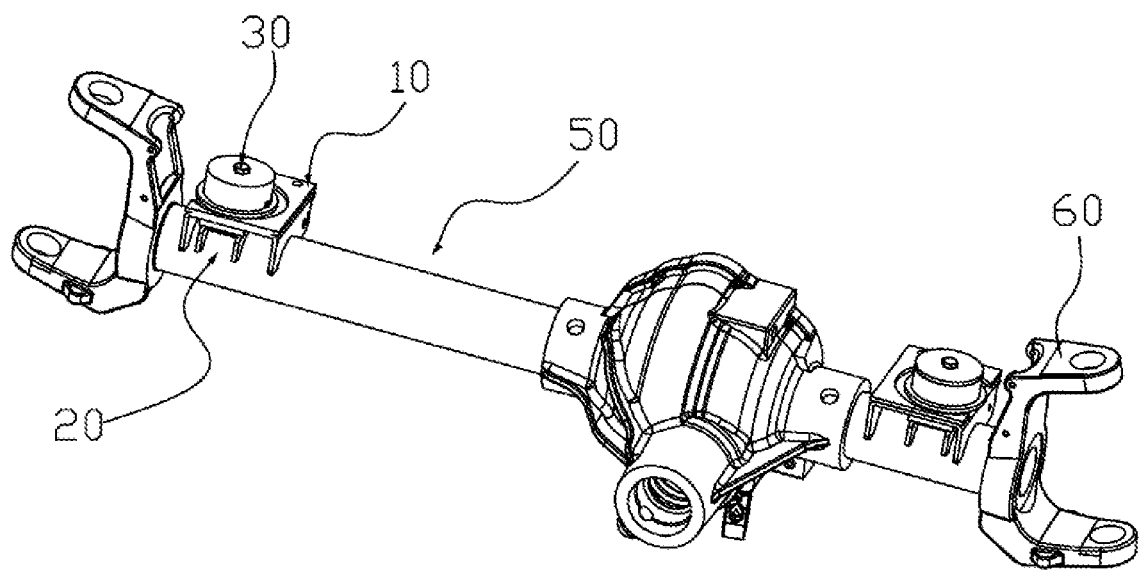
FIG. 7 is a schematic, isometric view of a vehicle including a second example of a spring support device.
Figure 8:
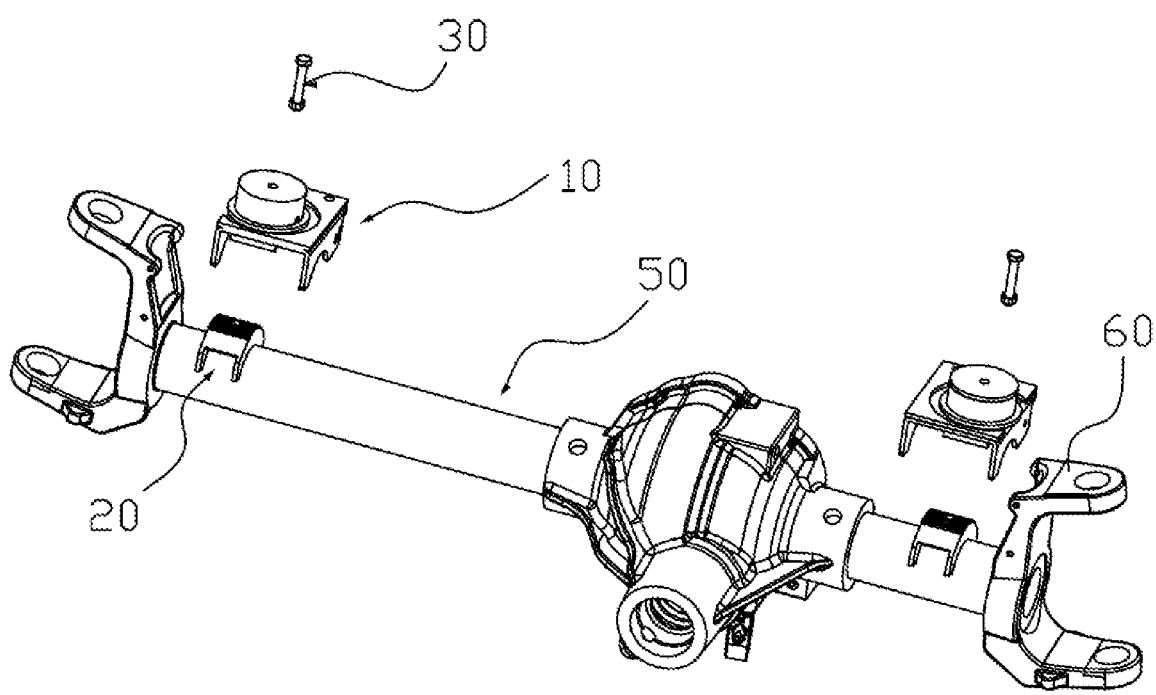
FIG. 8 is a schematic, exploded view of the vehicle in FIG. 8.
Figure 9:
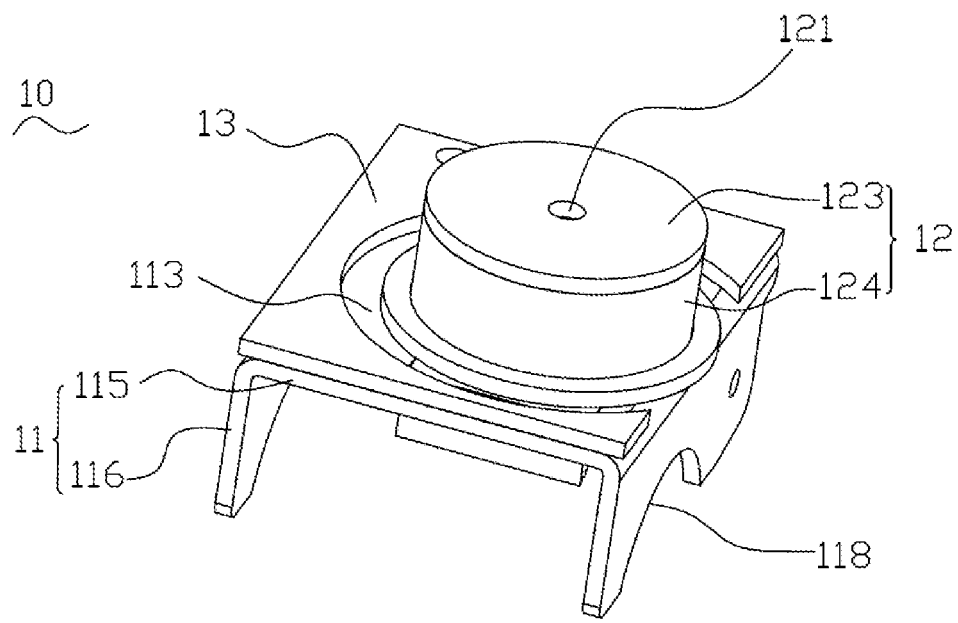
FIG. 9 is a schematic, isometric view of a first support unit in FIG. 8.
Figure 10:
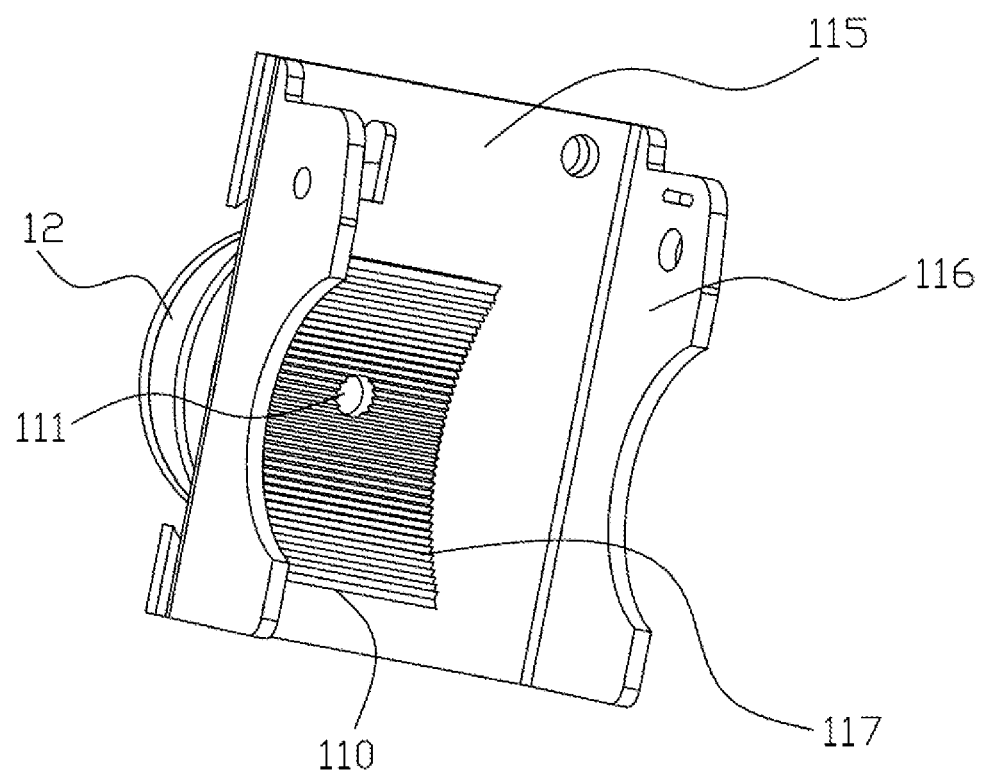
FIG. 10 is another schematic, isometric view of the first support unit in FIG. 8.
Figure 11:
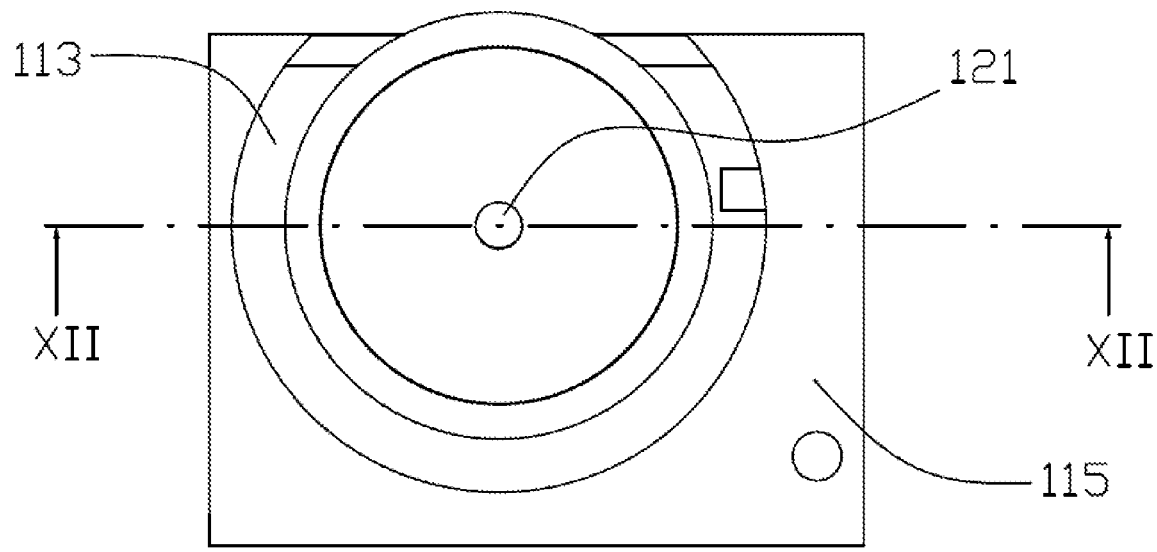
FIG. 11 is a schematic, top view of the first support unit in FIG. 8.
Figure 12:
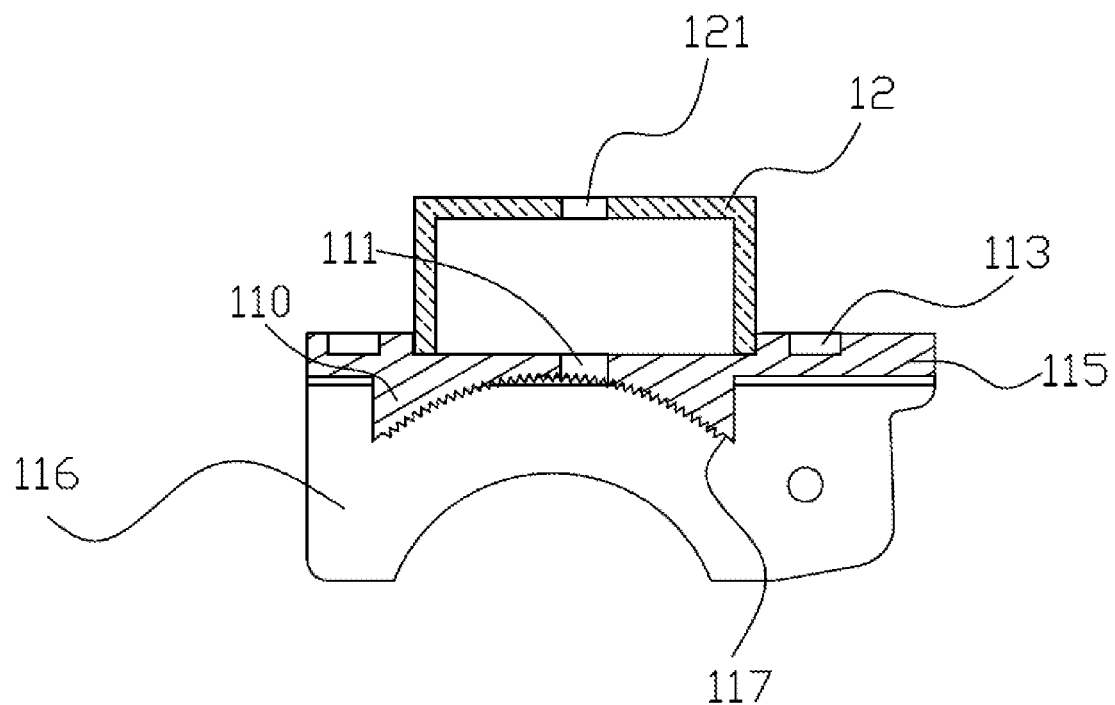
FIG. 12 is a schematic, cross-sectional view taken along line XII-XII of FIG. 12.
Figure 13:
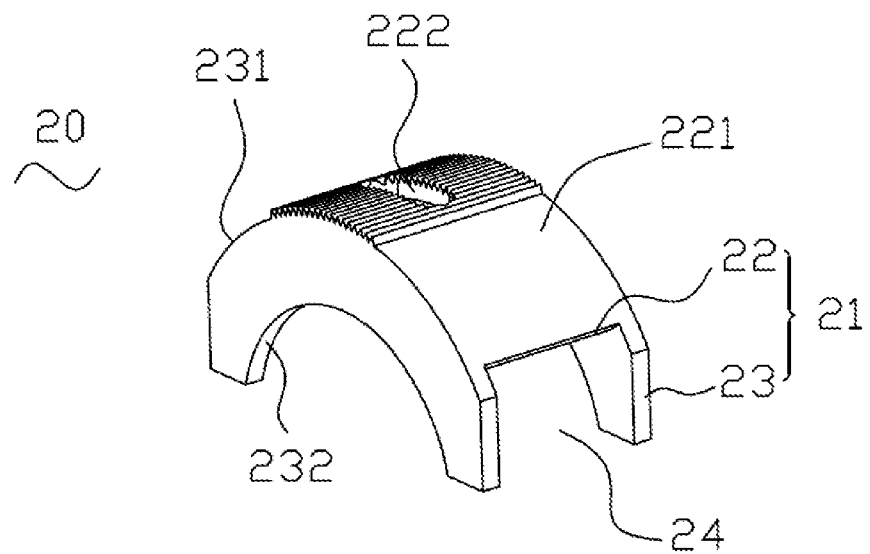
FIG. 13 is a schematic, isometric view of a second support unit in FIG. 8.
Figure 14:
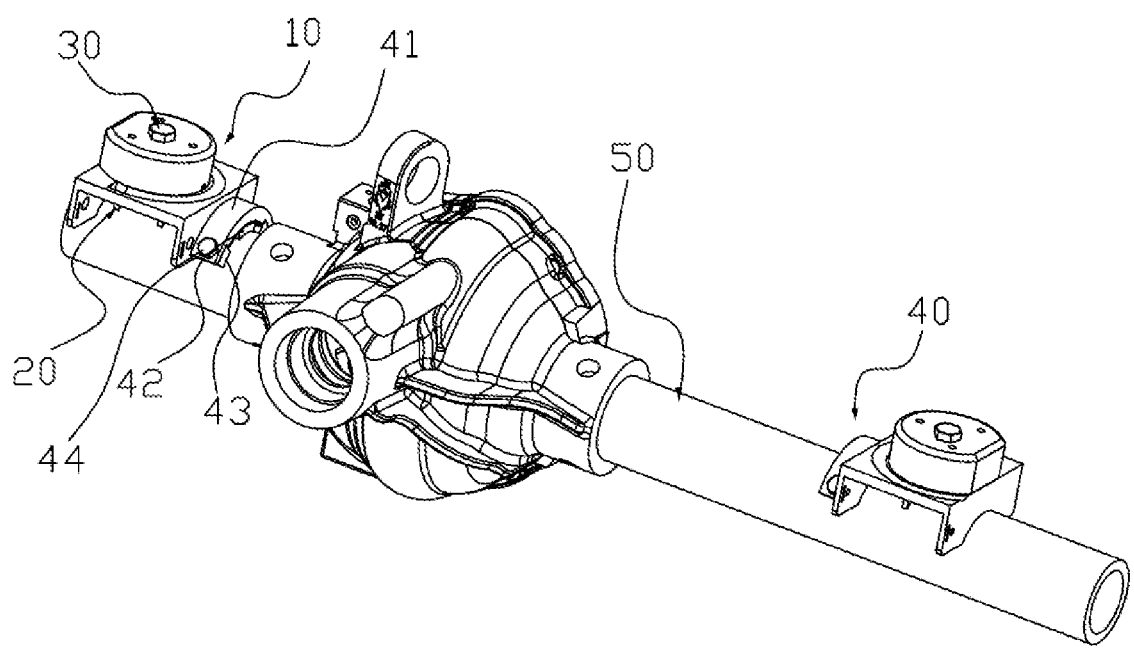
FIG. 14 is a schematic, isometric view of a vehicle including a third example of a spring support device.
Figure 15:
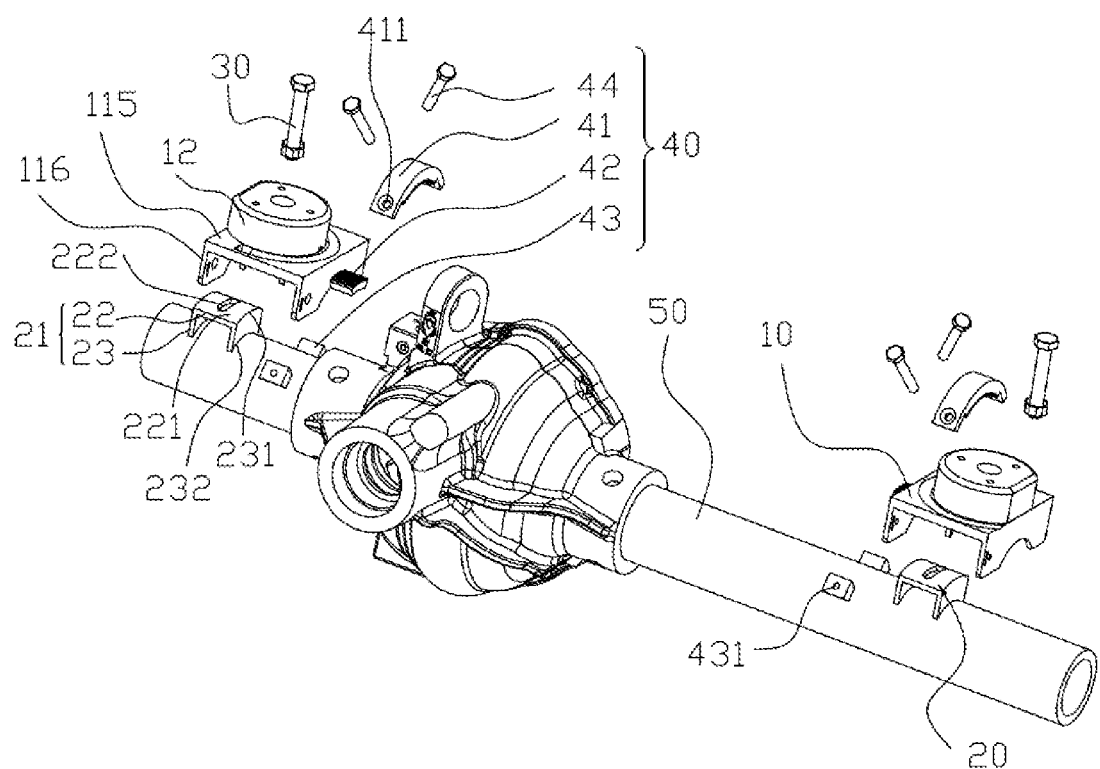
FIG. 15 is a schematic, exploded view of the vehicle in FIG. 14.
Figure 16:
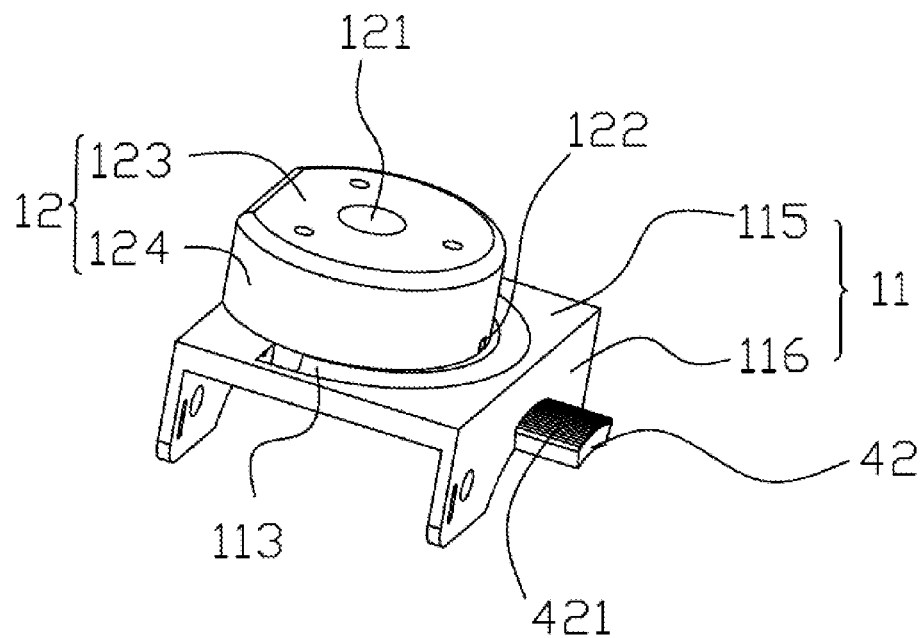
FIG. 16 is a schematic, isometric view of a first support unit in FIG. 15.
Figure 17:
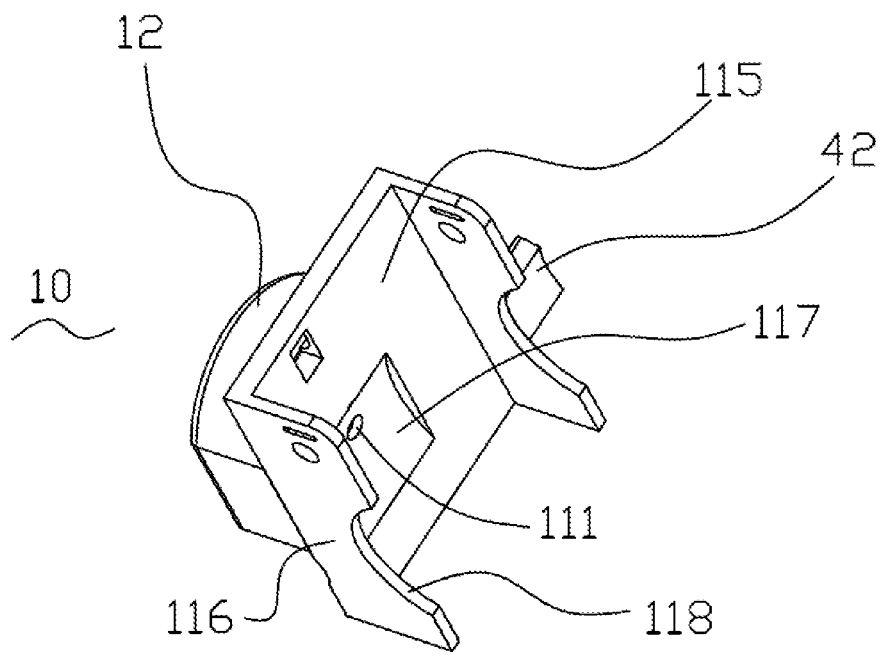
FIG. 17 is another schematic, isometric view of the first support unit in FIG. 15.
Figure 18:
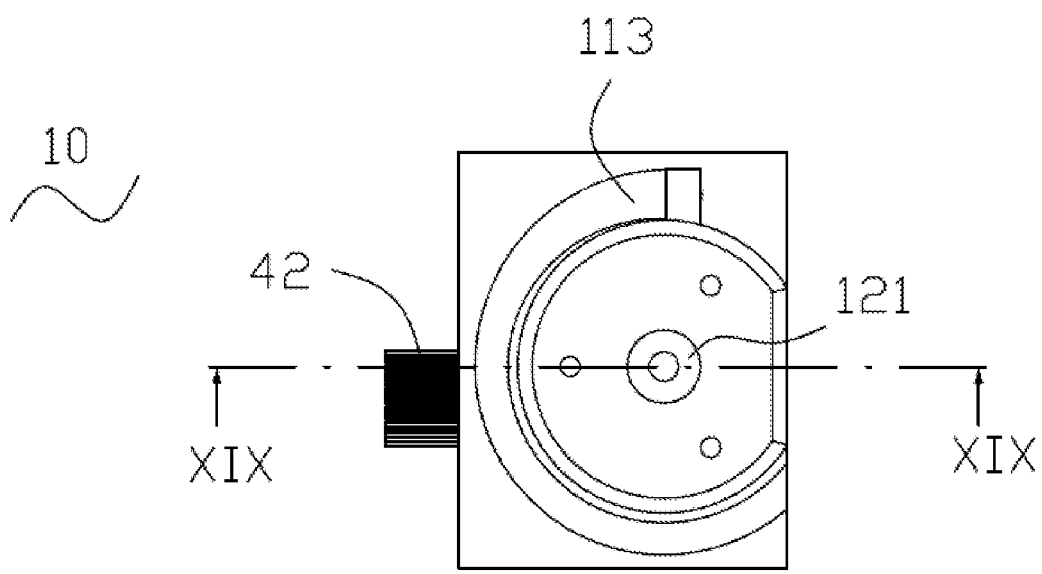
FIG. 18 is a schematic, top view of the first support unit in FIG. 15.
Figure 19:
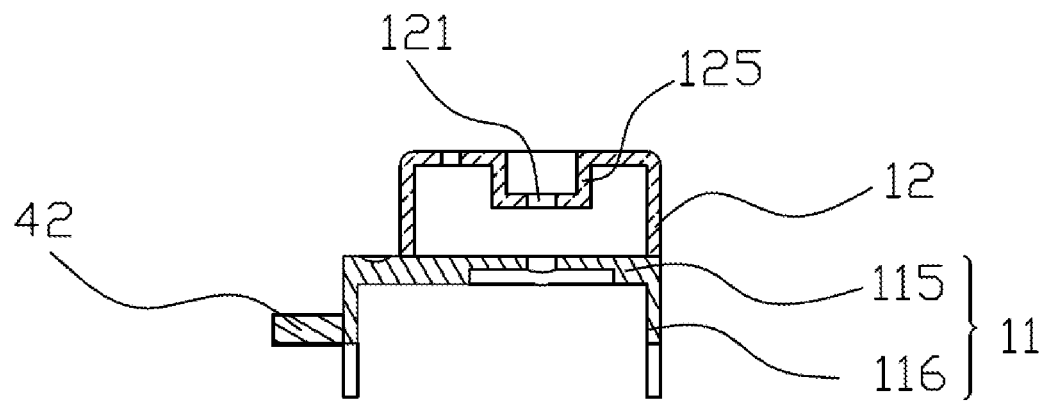
FIG. 19 is a schematic, cross-sectional view taken along line XIX-XIX of FIG. 18.
Figure 20:
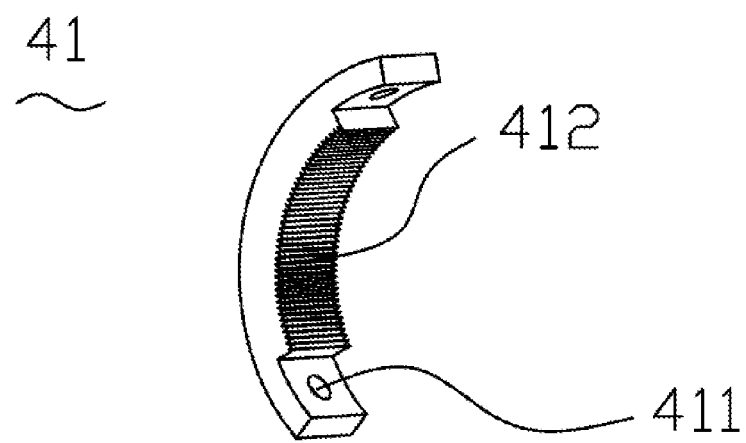
FIG. 20 is a schematic, isometric view of a cover plate in FIG. 15.

The first connection unit 30 may include a first connection member 31 and a fixation member 32. The first connection member 31 may be a screw bolt, a rivet or a pin which may be inserted through the second support unit 20 and the first support unit 10. The fixation member 32 may be a screw nut which is capable of cooperating with the screw bolt, or a plug which is capable of being radially inserted into a hole of the rivet. In this embodiment, the first connection member 31 is a screw bolt and the fixation member 32 is a screw nut. Referring to FIG. 5 and FIG. 6, during assembly, the first connection member 31 is inserted through the first connection hole 121, the second connection hole 111 and the elongate hole 222, and cooperates with the fixation member 32, so as to fix the first support unit 10 to the second support unit 20. Due to the configuration of the elongate hole 222, the first connection member 31 may locate at different positions of the elongate hole 222 if the installation angles of the first support unit 10 changes. When the second support unit 20 is bonded or welded to the vehicle body, an operation space 24 is formed between the second sidewall 23, the second support substrate 22 and the vehicle body, which is convenient for screwing the fixation member 32 to the first connection member 31. In the embodiment that the first contact surface 117 and the second contact surface 221 are arc-shaped surfaces, the force exerted by the first connection unit 30 may be greater than the embodiment that the first contact surface 117 and the second contact surface 221 are a portion of a polygon, or there may be a plurality of concavities on a lower surface of the second support substrate 22 and distributed along the elongate hole 222, for receiving at least a portion of the fixation member 32, so as to prevent the installation angles of the first support unit 10 from being changed after the fixation of the first connection unit 30.

In some embodiments, the spring support 12 is separately arranged from the first support body 11, and the spring support 12 is fixed to the first support body 11 through the first connection unit 30. Therefore, the positions between the spring support 12 and the first support body 11 in the X, Y and Z directions can be limited. Furthermore, the arrangement of the first indentation 122, the second indentation 112 and the insert block 14 can prevent the spring support 12 from rotating relative to the first support body 11. Through the cooperation of the two arrangements, the spring support 12 can be well fixed to the first support body 11.

Due to the separation arrangement between the spring support 12 and the first support body 11, suitable first support body 11 and spring support 12 can be selected as required, so as to satisfy requirements of different vehicles in the vehicle modification process. Furthermore, since the spring support 12 is separated from the first support body 11, an area between the spring support 12 and the first support body 11 can be sprayed before assembly when spraying protective paint. Therefore, it is convenient to spray protective paint efficiently.

Second Embodiment

Referring to FIG. 7 to FIG. 13, a second embodiment of the spring support device is provided. The second embodiment of the spring support device is substantially the same as the first embodiment of the spring support device. The main difference between the second embodiment and the first embodiment is, in the second embodiment, one of the first contact surface 117 and the second contact surface 221 is provided with a plurality of protrusions, the other one of the first contact surface 117 and the second contact surface 221 is provided with a plurality of depressions. The protrusions and the depressions are distributed along circumferential directions of a corresponding contact surface. The protrusions each is capable of engaging with different depressions, therefore, the first support unit 10 may engage with different circumferential portions of the second support unit 20, and have different installation angles relative to the second support unit 20, which makes the damper spring on the first support unit 10 may have different relative angles to the vehicle body. In some embodiments, the first contact surface 117 and the second contact surface 221 are both provided with a plurality of gear teeth or a plurality of splines. This means the protrusions are the gear teeth or the splines, and the depressions are formed between adjacent gear teeth or adjacent splines.

In detail, in the second embodiment, the spring support device includes a first support unit 10, a second support unit 20 and a first connection unit 30. The first support unit 10 is configured for supporting a damper spring. The second support unit 20 is fixed to a vehicle body, such as an axle tube 50 of a vehicle. The first connection unit 30 is capable of detachably fixing the first support unit 10 to the second support unit 20.

The first support unit 10 includes a first support body 11 and a spring support 12 which is separated from the first support body 11. The spring support 12 is provided with a first connection hole 121, the first support body 11 is provided with a second connection hole 111, a portion of the first connection unit 30 is inserted through the first connection hole 121 and the second connection hole 111, for fixing the spring support 12 to the first support body 11. The spring support 12 is provided with a first indentation 122 on a side facing the first support body 11, the first support body 11 is provided with a second indentation 112 on a side facing the spring support 12. An insert block 14 is disposed in the first indentation 122 and the second indentation 112, to prevent the spring support 12 from rotating relative to the first support body 11.

The first support body 11 includes a first support substrate 115 and two first sidewalls 116. The first support substrate 115 is substantially rectangular shaped, and has a projection 110 downwardly extending from a lower side thereof. The projection 110 has an arc-shaped first contact surface 117 on a lower side. The first contact surface 117 is a convex surface with a central portion thereof protruding toward the spring support 12. The second connection hole 111 and the second indentation 112 are formed on the first support substrate 115, and the spring support 12 is arranged on an upper side of the first support substrate 115. A pad 13 is arranged at an upper side of the first support substrate 115, and a C-shaped recess 113 at a portion surrounding the spring support 12 is defined in the pad 13, for enclosing a bottom end of the damper spring. Alternatively, in some embodiments, there may be no pad 13, and the recess 113 is defined in the first support substrate 115.

The first sidewalls 116 extend downwardly from opposite left and right sides of the first support substrate 115. The first sidewall 116 is substantially rectangular shaped, and has a first arc surface 118 on a lower portion thereof. The first arc surface 118 is coplanar with an outer circumferential surface of the axle tube 50, which makes the first sidewall 116 of the first support unit 10 can perfectly match the outer circumferential surface of the axle tube 50. Therefore, the first support unit 10 can slide around the axle tube 50 during assembly, and the first support unit 10 may have different installation angles on the axle tube 50. When the first support unit 10 is placed on the second support unit 20, the second support unit 20 is located between the two first sidewalls 116, with the first arc surface 118 of the first sidewall 116 abutting against the axle tube 50, in order to optimize a force exerted on the first support unit 10.

The spring support 12 is fixed to the first support substrate 115 at a side away from the vehicle body. The spring support 12 has an end plate 123 and an annular wall 124 extending downwardly from an outer edge of the end plate 123. The end plate 123 is substantially round shape and the first connection hole 121 is defined in a middle portion thereof. The first indentation 122 is defined in the annular wall 124 at an end adjacent to the first support substrate 115. The first connection hole 121 aligns with the second connection hole 111, allowing the first connection unit 30 passing through. In this embodiment, the first connection hole 121 and the second connection hole 111 are round holes.

The second support unit 20 includes a second support body 21 which includes a second support substrate 22 and two second sidewalls 23. The second sidewalls 23 are arranged at opposite left and right sides of the second support substrate 22.

Viewed from the left or the right side of the second support unit 20 (i.e., viewed from Y direction of the vehicle), the second support substrate 22 is arc-shaped and the second sidewalls 23 are substantially sector-shaped. The second support substrate 22 has an arc-shaped second contact surface 221 on an upper side for contacting with the first contact surface 117. The second contact surface 221 is a convex surface with a central portion thereof protruding toward the first support unit 10. One of the first contact surface 117 and the second contact surface 221 is provided with the plurality of protrusions, the other one of the first contact surface 117 and the second contact surface 221 is provided with the plurality of depressions. The second support substrate 22 includes an elongate hole 222 which extends along a circumferential direction of the second contact surface 221, for allowing at least a portion of the first connection unit 30 passing through.

The second sidewall 23 has a second arc surface 231 and a third arc surface 232. The second arc surface 231 is disposed at an outer portion of the second sidewall 23 and coplanar with the second contact surface 221. The third arc surface 232 is disposed at an inner portion of the second sidewall 23 and parallel to the second arc surface 231. That is, the third arc surface 232 and the second arc surface 231 are coaxial surfaces. In some embodiments, the third arc surface 232 is coplanar with the outer circumferential surface of the axle tube 50, resulting the second support unit 20 can be firmly bonded or welded to the axle tube 50 into a single piece.

The first connection unit 30 may include a first connection member 31 and a fixation member 32. The first connection member 31 may be a screw bolt, a rivet or a pin which may insert through the second support unit 20 and the first support unit 10. The fixation member 32 may be a screw nut which is capable of cooperating with the screw bolt, or a plug which is capable of being radially inserted into a hole of the rivet. In this embodiment, the first connection member 31 is a screw bolt and the fixation member 32 is a screw nut. During assembly, the first connection member 31 is inserted through the first connection hole 121, the second connection hole 111 and the elongate hole 222, and cooperates with the fixation member 32, so as to fix the first support unit 10 to the second support unit 20. Due to the configuration of the elongate hole 222, the first connection member 31 may locate at different positions of the elongate hole 222 if the installation angles of the first support unit 10 changes. When the second support unit 20 is bonded or welded to the vehicle body, an operation space 24 is formed between the second sidewall 23, the second support substrate 22 and the vehicle body, which is convenient for screwing the fixation member 32 to the first connection member 31.

In some embodiments, the spring support 12 is separately arranged from the first support body 11, and the spring support 12 is fixed to the first support body 11 through the first connection unit 30. Therefore, the positions between the spring support 12 and the first support body 11 in the X, Y and Z directions can be limited. Furthermore, the arrangement of the first indentation 122, the second indentation 112 and the insert block 14 can prevent the spring support 12 from rotating relative to the first support body 11. In addition, the elongate hole 222 and the arrangement of the protrusions and depressions make the spring support 12 may face different directions as required. Moreover, the arrangement of the protrusions and depressions can prevent the first support unit 10 from rotating relative to the second support unit 20 and the axle tube 50.

Due to the separation arrangement between the spring support 12 and the first support body 11, suitable first support body 11 and spring support 12 can be selected as required, and suitable orientation of the spring support 12 can be selected as well, which satisfies requirements of different vehicles in the vehicle modification process. Furthermore, since the spring support 12 is separated from the first support body 11, the position between the spring support 12 and the first support body 11 can be sprayed before assembly when spraying protective paint, which is convenient to spray protective paint efficiently.

Third Embodiment

Referring to FIG. 14 to FIG. 20, a third embodiment of the spring support device is provided. The third embodiment of the spring support device is substantially the same as the first embodiment of the spring support device. The main difference between the third embodiment and the first embodiment is, in the third embodiment, the spring support device further includes a second connection unit 40 disposed at one side of the first support unit 10 and the second support unit 20. In this embodiment, the first connection unit 30 and the second connection unit 40 each provides a fixation point between the first support unit 10 and the second support unit 40, for enhancing connections between the first support unit 10 to the second support unit 20.

In detail, in the third embodiment, the spring support device includes a first support unit 10, a second support unit 20, a first connection unit 30 and a second connection unit 40. The first support unit 10 is configured for supporting a damper spring. The second support unit 20 is fixed to a first portion of a vehicle body, such as an axle tube 50 of a vehicle. The first connection unit 30 and the second connection unit 40 are capable of detachably fixing the first support unit 10 to the second support unit 20.

The first support unit 10 includes a first support body 11 and a spring support 12 which is fixed to an upper side of the first support body 11. The spring support 12 has an end plate 123 and an annular wall 124 extending downwardly from an outer edge of the end plate 123. The end plate 123 is substantially round shape and has a depressed platform 125 at a middle portion thereof. A first connection hole 121 is defined in the depressed platform 125. A first indentation 122 is defined in the annular wall 124 at an end adjacent to the first support body 11.

The first support body 11 includes a first support substrate 115 and two first sidewalls 116. The first support substrate 115 is substantially rectangular shaped, and has an arc-shaped first contact surface 117 on a lower side. The first contact surface 117 is a convex surface with a central portion thereof protruding toward the spring support 12. A second connection hole 111 is defined in a middle portion of the first support substrate 115. The second connection hole 111 aligns with the first connection hole 121, allowing a portion of the first connection unit 30 passing through. In this embodiment, the first connection hole 121 and the second connection hole 111 are round holes. A second indentation is formed on the first support substrate 115 at a portion corresponding to the first indentation 122. An insert block is disposed in the first indentation 122 and the second indentation, preventing the spring support 12 from rotating relative to the first support body 11. A C-shaped recess 113 is defined in the first support substrate 115, for enclosing a bottom end of the damper spring. Alternatively, in some embodiments, there may be a pad disposed on the first support substrate 11, and the recess 113 is defined in the pad.

The first sidewalls 116 extend downwardly from opposite left and right sides of the first support substrate 115. The first sidewall 116 is substantially rectangular shaped, and has a first arc surface 118 on a lower portion thereof. The first arc surface 118 is coplanar with an outer circumferential surface of the axle tube 50, which makes the first sidewall 116 of the first support unit 10 can perfectly match the outer circumferential surface of the axle tube 50. Therefore, the first support unit 10 can slide around the axle tube 50 during assembly, and the first support unit 10 may have different installation angles on the axle tube 50.

The second support unit 20 includes a second support body 21 which includes a second support substrate 22 and two second sidewalls 23. The second sidewalls 23 are arranged at opposite left and right sides of the second support substrate 22.

Viewed from the left or the right side of the second support unit 20 (i.e., viewed from Y direction of the vehicle), the second support substrate 22 is arc-shaped and the second sidewalls 23 are substantially sector-shaped. The second support substrate 22 has an arc-shaped second contact surface 221 on an upper side for contacting with the first contact surface 117. The second contact surface 221 is a convex surface with a central portion thereof protruding toward the first support unit 10. The second support substrate 22 includes an elongate hole 222 which extends along a circumferential direction of the second contact surface 221, for allowing the first connection unit 30 passing through.

The second sidewall 23 has a second arc surface 231 and a third arc surface 232. The second arc surface 231 is disposed at an outer portion of the second sidewall 23 and coplanar with the second contact surface 221. The third arc surface 232 is disposed at an inner portion of the second sidewall 23 and parallel to the second arc surface 231. That is, the third arc surface 232 is coaxial with the second arc surface 231. In some embodiments, the third arc surface 232 is coplanar with the outer circumferential surface of the axle tube 50, resulting the second support unit 20 can be firmly bonded or welded to the axle tube 50.

The first connection unit 30 may include a first connection member 31 and a fixation member 32. The first connection member 31 may be a screw bolt, a rivet or a pin which may insert through the second support unit 20 and the first support unit 10. The fixation member 32 may be a screw nut which is capable of cooperating with the screw bolt, or a plug which is capable of being radially inserted into a hole of the rivet. In this embodiment, the first connection member 31 is a screw bolt and the fixation member 32 is a screw nut. During assembly, the first connection member 31 is inserted through the first connection hole 121, the second connection hole 111 and the elongate hole 222, and cooperates with the fixation member 32, providing a first fixation point for the first support unit 10. Due to the configuration of the elongate hole 222, the first connection member 31 may locate at different positions of the elongate hole 222 if the installation angles of the first support unit 10 changes. When the second support unit 20 is bonded or welded to the vehicle body, an operation space 24 is formed between the second sidewall 23, the second support substrate 22 and the vehicle body, which is convenient for screwing the fixation member 32 to the first connection member 31.

The second connection unit 40 may include a cover plate 41, a first connection base 42, a second connection base 43, and two second connection members 44. Alternatively, the numbers of the second connection member is not limited. The first connection base 42 is connected with the first support body 11. The cover plate 41 is capable of covering the first connection base 42. The second connection base 43 is disposed under the first connection base 42 and connected with the vehicle body. The second connection member 44 is capable of going through the cover plate 41 and connecting with the second connection base 43, such that the first connection base 42 is sandwiched between the cover plate 41 and the second connection base 43, which makes the first support unit 10 be fixed to the second support unit 20.

The cover plate 41 is arc-shaped as viewed from the left or right side of the vehicle. An arc-shaped third contact surface 412 is formed on a lower side of the cover plate 41, and two first mounting holes 411 are defined at two ends of the cover plate 41.

The first connection base 42 is integrally formed with or welded to one side of the first sidewall 116 into a single piece. The first connection base 42 is arc-shaped as viewed from the left or right side of the vehicle, and an arc-shaped fourth contact surface 421 is formed on an upper side of the first connection base 42. One of the third contact surface 412 and the fourth contact surface 421 is provided with a plurality of protrusions, the other one of the third contact surface 412 and the fourth contact surface 421 is provided with a plurality of depressions. The protrusions or the depressions are disposed along the third contact surface 412 and the fourth contact surface 421. The protrusions each is capable of engaging with different depressions, such that the first support unit 10 may be mounted to different circumferential portions of the cover plate 41, and may have different installation angles relative to the second support unit 20, which makes the damper spring on the first support unit 10 may have different relative angles to the vehicle body. In some embodiments, the third contact surface 412 and the fourth contact surface 421 are provided with a plurality of gear teeth or a plurality of splines. This means the protrusions are the gear teeth or the splines, and the depressions are formed between adjacent gear teeth or adjacent splines. A longitudinal length of the third contact surface 412 is greater than a longitudinal length of the fourth contact surface 421, such that the cooperation positions of the first connection base 42 and the cover plate 41 can be regulated, which makes the first support unit 10 can be fixed at different installation angles relative to the second support unit 20.

The second connection base 43 is disposed at one side of the second support body 21 and is integrally fixed to the axle tube 50 by bonding or welding manner. In some embodiment, the second connection base 43 may not be fixed to the axle tube 50 into a single body, but be fixed to the second support body 21 instead. That is, the second connection base 43 is integrally fixed to the axle tube 50 into a single piece through the second support body 21. The second connection base 43 includes two mounting blocks which are separately arranged along a circumferential direction of the axle tube 50. The mounting blocks each has a second mounting hole 431 defined therein.

The second connection members 44 may be screws which can be screwed in the second connection base 43, such that the first connection base 42 is sandwiched between the cover plate 41 and the second connection base 43. Alternatively, the second connection members 44 may be screw bolts, rivets or pins, which may cooperate with corresponding accessories to fix the first connection base 42 to the second connection base 43. During assembly, the second connection members 44 go through the first mounting holes 411 and are screwed in the second mounting holes 431, providing a second fixation point for the first support unit 10.

In some embodiments, the spring support 12 is separately arranged from the first support body 11, and the spring support 12 is fixed to the first support body 11 through the first connection unit 30. Therefore, the positions between the spring support 12 and the first support body 11 in the X, Y and Z directions can be limited. Furthermore, the arrangement of the first indentation 122, the second indentation 112 and the insert block 14 can prevent the spring support 12 from rotating relative to the first support body 11. In addition, the elongate hole 222 and the arrangement of the protrusions and depressions make the spring support 12 may face different directions as required. Moreover, the arrangement of the protrusions and depressions can prevent the first support unit 10 from rotating relative to the second support unit 20 and the axle tube 50.

Due to the separation arrangement between the spring support 12 and the first support body 11, suitable first support body 11 and spring support 12 can be selected as required, and suitable orientation of the spring support 12 can be selected as well, which satisfies requirements of different vehicles in the vehicle modification process. Furthermore, since the spring support 12 is separated from the first support body 11, the position between the spring support 12 and the first support body 11 can be sprayed before assembly when spraying protective paint, which is convenient to spray protective paint efficiently.

Figure 21:
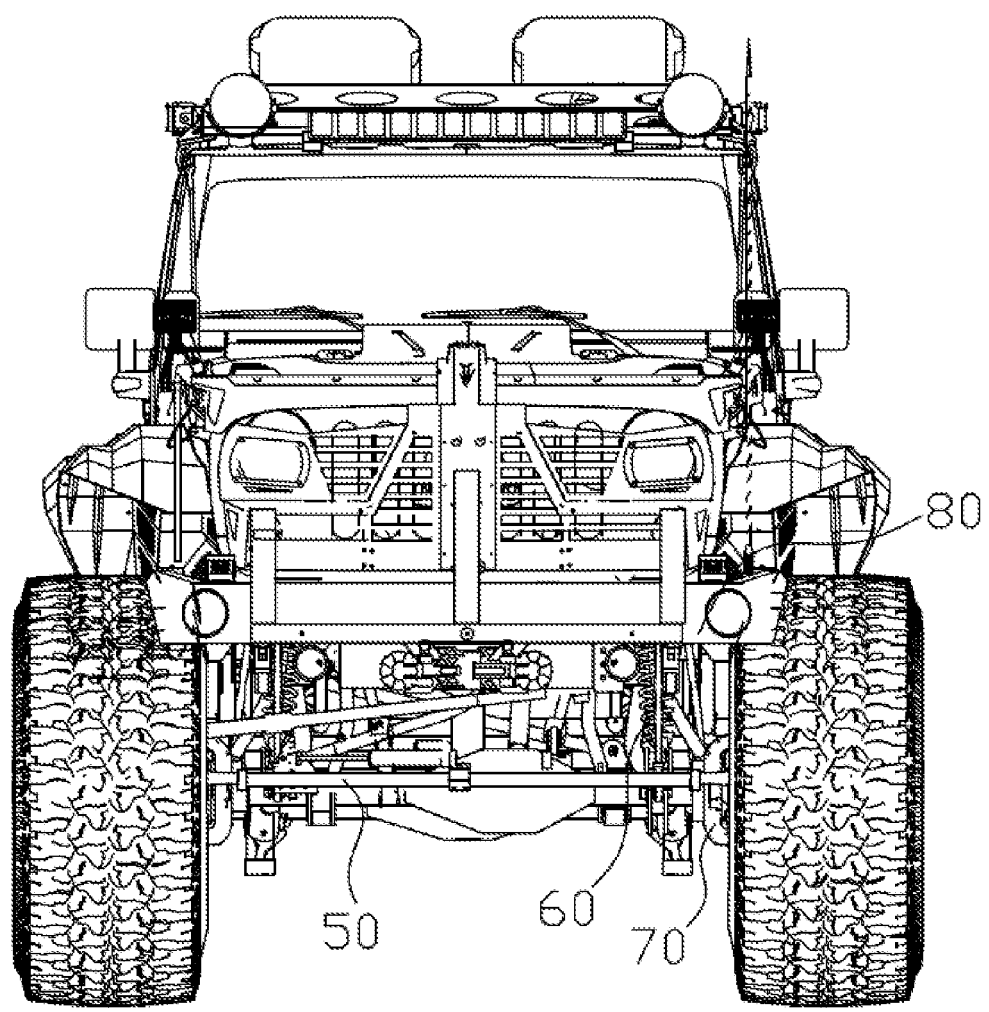
FIG. 21 is a schematic, front view of an example of a vehicle having the spring support device.

Referring to FIG. 21, some embodiments may include a vehicle. The vehicle includes the spring support device, a damper spring 60 and a steering knuckle 70. The damper spring 60 is connected to a second portion of the vehicle body 80, such as a vehicle chassis. The spring support device is used to connect the first portion of the vehicle body 80 (such as the axle tube 50) and the damper spring 60, and its structure is described as forgoing. The steering knuckle 70 is located at one side of the spring support device, for connecting with a kingpin. In some embodiments, the steering knuckle 70 may be an inner-C-forgoing. The second support unit 20 of the spring support device is fixed to the axle tube 50. The first connection unit 30 and the second connection unit 40 each provides a fixation point for the first support unit 10, for detachably fixing the first support unit 10 to the second support unit 20. An installation angle of the first support unit 10 relative to the second support unit 20 can be regulated as required, making the steering knuckle 70 have different installation angles on the vehicle, and a caster to pinion angle will be different as well.

The above are merely specific embodiments of the present document, but are not intended to limit the protection scope of the present document. Any variations or replacements which will become apparent to those skilled in the art to which the present document pertains, shall also fall within the protection scope of the present document. Therefore, the protection scope of the present document shall be subject to the appended claims.

What is claimed is:

1. A spring support device, comprising:
a first support unit for supporting a damper spring, comprising:

a first support body configured for being connected to a vehicle body; and
a spring support which is detachably fixed to the first support body;
the spring support device further comprises a first connection unit configured for detachably fixing the spring support to the first support body;
the spring support is provided with a first connection hole, the first support body is provided with a second connection hole, the first connection unit is capable of passing through the first connection hole and the second connection hole, for fixing the spring support to the first support body.

2. The spring support device according to claim 1, wherein the spring support is provided with a first indentation, the first support body is provided with a second indentation, an insert block is disposed in the first indentation and the second indentation, preventing the spring support from rotating relative to the first support body.

3. The spring support device according to claim 1, wherein the first connection unit comprises a first connection member and a fixation member, the first connection member passes through the first connection hole and the second connection hole, the fixation member cooperates with the first connection member, preventing the first connection member from coming out of the first support unit.

4. The spring support device according to claim 1, wherein the spring support device further comprises a second support unit which is fixed to the vehicle body, the first support unit is detachably fixed to the second support unit by the first connection unit.

5. The spring support device according to claim 4, wherein the second support unit is provided with an elongate hole, the first connection unit passes through the first connection hole, the second connection hole and the elongate hole, for fixing the first support unit to the second support unit.

6. The spring support device according to claim 5, wherein the first support body comprises a first support substrate and two first sidewalls disposed at opposite sides of the first support substrate, the second support unit comprises a second support substrate and two second sidewalls disposed at opposite sides of the second support substrate, the elongate hole is defined in the second support substrate, the spring support is detachably fixed to the first support substrate, the first sidewall has a first arc surface which is capable of sliding around an axle tube of the vehicle body.

7. The spring support device according to claim 5, wherein the first support unit has a first contact surface, the second support unit has a second contact surface capable of having different angles relative to the first contact surface.

8. The spring support device according to claim 7, wherein one of the first contact surface and the second contact surface is provided with a plurality of protrusions, the other one of the first contact surface and the second contact surface is provided with a plurality of depressions, the protrusions each is capable of engaging with different depressions.

9. The spring support device according to claim 4, wherein the spring support device comprises a second connection unit disposed at one side of the first support unit and the second support unit, for fixing the first support unit to the second support unit.

10. The spring support device according to claim 9, wherein the second connection unit comprises a cover plate, a first connection base, and a second connection member, the first connection base is connected with the first support unit, the cover plate is capable of covering the first connection base, the second connection member is capable of going through the cover plate and connecting with the vehicle body, for fixing the first support unit to the second support unit.

11. The spring support device according to claim 10, wherein the second connection unit further comprises a second connection base being connected to the vehicle body, the second connection base is disposed between the first connection base and the vehicle body, the second connection member is capable of going through the cover plate and connecting with the second connection base, to fix the first support unit to the second support unit.

12. The spring support device according to claim 10, wherein the first connection base comprises a third contact surface, the cover plate comprises a fourth contact surface, one of the third contact surface and the fourth contact surface is provided with a plurality of protrusions, the other one of the third contact surface and the fourth contact surface is provided with a plurality of depressions, the protrusions each is capable of engaging with different depressions.

13. A spring support device, comprising:
a first support unit configured for supporting a damper spring;
a second support unit configured for being fixed to a vehicle body;
a first connection unit capable of providing a first fixation point for the first support unit to the second support unit; and
a second connection unit capable of providing a second fixation point for the first support unit to the second support unit.

14. The spring support device according to claim 13, wherein the second connection unit comprises a first connection base capable of moving together with the first support unit, and a cover plate capable of covering the first connection base, the first support unit comprises a first contact surface, the second support unit comprises a second contact surface capable of having different angles relative to the first contact surface, the first connection base comprises a third contact surface, the cover plate comprises a fourth contact surface capable of having different angles relative to the third contact surface, a plurality of protrusions and a plurality of depressions are formed between the first contact surface and the second contact surface, or between the third contact surface and the fourth contact surface, and the protrusions each is capable of engaging with different depressions.

15. The spring support device according to claim 14, wherein the first support unit comprises a first support substrate, two first sidewalls disposed at opposite sides of the first support substrate, and a spring support detachably connected with the first support substrate, the second support unit comprises a second support substrate and two second sidewalls being fixed to an axle tube of the vehicle body, the second support substrate is provided with an elongate hole for allowing the first connection unit passing through, if the second contact surface is disposed at different angles relative to the first contact surface, the first connection unit locates at different longitudinal positions of the elongate hole.

16. A vehicle, comprising:
a damper spring; and
a spring support device for supporting the damper spring, comprising:
a first support unit comprising:

a first support body configured for being connected to an axle tube of a vehicle body; and a spring support which is detachably fixed to the first support body, and the first support body is capable being sandwiched between the spring support and the axle tube; and a first connection unit configured for detachably connecting the first support body to the vehicle body.

17. The vehicle according to claim 16, wherein the spring support is provided with a first indentation and a first connection hole, the first support body is provided with a second indentation and a second connection hole, an insert block is disposed in the first indentation and the second indentation, preventing the spring support from rotating relative to the first support body, the first connection unit passes through the first connection hole and the second connection hole, fixing the spring support to the first support body.

18. The vehicle according to claim 16, wherein the spring support device further comprises a second support unit being fixed to the vehicle body, the first connection unit provides a first fixation point for the first support unit to the second support unit.

19. The vehicle according to claim 18, wherein the first support body comprises a first support substrate and two first sidewalls disposed at opposite sides of the first support substrate, the second support unit comprises a second support substrate and two second sidewalls disposed at opposite sides of the second support substrate, the second support substrate is provided with an elongate hole, the first connection unit passes through the first support substrate and the elongate hole, to fix the first support body to the second support body at the first fixation unit.

20. The vehicle according to claim 18, wherein the spring support device further comprises a second connection unit disposed at one side of the first support unit and the second support unit, for providing a second fixation point for the first support unit to the second support unit.

21. The vehicle according to claim 20, wherein the second connection unit comprises a first connection base capable of moving together with the first support unit, and a cover plate capable of covering the first connection base, the first support unit comprises a first contact surface, the second support unit comprises a second contact surface, the first connection base comprises a third contact surface, the cover plate comprises a fourth contact surface, a plurality of protrusions and a plurality of depressions are formed between the first contact surface and the second contact surface, or between the third contact surface and the fourth contact surface, and the protrusions each is capable of engaging with different depressions.

22. The spring support device according to claim 1, wherein the first support body is configured for being connected to an axle tube of the vehicle body, and the first support body is capable of rotating relative to the axle tube.

23. The spring support device according to claim 1, wherein the first connection unit is capable of further passing through a portion of the vehicle body, and the first support body is connected to the vehicle body through the first connection unit.

24. The vehicle according to claim 16, wherein the spring support is provided with a first connection hole, the first support body is provided with a second connection hole, the first connection unit sequentially passes through the first connection hole and the second connection hole, for fixing the spring support to the first support body.

25. The vehicle according to claim 24, wherein the first connection unit comprises a first connection member and a fixation member, the first connection member sequentially passes through the first connection hole and the second connection hole, the fixation member cooperates with the first connection member, preventing the first connection member from coming out of the first support unit.

26. The vehicle according to claim 24, wherein the first connection unit further passes through a portion of the vehicle body, and the first support body is connected to the vehicle body through the first connection unit.

27. The vehicle according to claim 16, wherein the first support body is capable of rotating relative to the axle tube, the spring support is column shaped and the damper spring has a portion being disposed around the spring support.

* * * * *